US005383090A

United States Patent [19]

Freundner et al.

[11] Patent Number: 5,383,090

[45] Date of Patent: Jan. 17, 1995

[54] ELECTRICAL ENERGY DISTRIBUTION SYSTEM

[75] Inventors: Hasso Freundner, Halver; Walter Grabowski, deceased, late of Olpe, Germany, by Erika Grabowski, Thomas Grabowski, Michael Grabowski, heirs

[73] Assignee: Dorma GmbH & Co. KG, Ennepetal, Germany

[21] Appl. No.: 127,957

[22] Filed: Sep. 28, 1993

[30] Foreign Application Priority Data

Mar. 28, 1991 [DE] Germany ............................ 4110251

Feb. 5, 1992 [WO] WIPO ................ PCT/DE92/00092

[51] Int. Cl.[6] ............................................ H02B 1/20

[52] U.S. Cl. .................................. 361/624; 174/68.2; 439/118; 439/812; 361/640

[58] Field of Search .................. 174/68.2, 70 B, 99 B; 439/116–118, 210, 807, 810–813; 361/601, 605, 611, 622, 624, 637, 638, 640, 356, 648, 649, 657, 675, 823

[56] References Cited

U.S. PATENT DOCUMENTS

| | | | |
|---|---|---|---|
| 3,125,398 | 3/1964 | Wolf | 439/812 |
| 3,813,635 | 5/1974 | Cooper, Jr. | 339/22 B |
| 3,864,005 | 2/1975 | Klein | 439/812 |
| 4,119,816 | 10/1978 | Davis | 361/355 |
| 4,997,388 | 3/1991 | Dale | 439/404 |
| 5,101,080 | 3/1992 | Ferenc . | |
| 5,141,447 | 8/1992 | Poirier | 439/207 |

FOREIGN PATENT DOCUMENTS

| | | |
|---|---|---|
| 0299811 | 1/1989 | European Pat. Off. . |
| 0330525 | 8/1989 | European Pat. Off. . |
| 0391100 | 10/1990 | European Pat. Off. . |
| 0407241 | 1/1991 | European Pat. Off. . |
| 0413242 | 2/1991 | European Pat. Off. . |
| 1139329 | 6/1957 | France . |
| 1042058 | 10/1958 | Germany . |
| 1797821 | 7/1959 | Germany . |
| 1904072 | 6/1964 | Germany . |
| 1903567 | 11/1964 | Germany . |
| 7105420 | 5/1972 | Germany . |
| 7210696 | 6/1972 | Germany . |
| 2301460 | 7/1974 | Germany . |
| 2405049 | 8/1975 | Germany . |
| 2456362 | 8/1976 | Germany . |
| 7703345 | 5/1977 | Germany . |
| 7918946 | 12/1979 | Germany . |
| 3238483 | 3/1984 | Germany . |
| 8602883 | 7/1987 | Germany . |
| 3642518 | 3/1988 | Germany . |
| 3811456 | 10/1989 | Germany . |
| 3811458 | 10/1989 | Germany . |
| 9005168 | 9/1990 | Germany . |
| 3924045 | 1/1991 | Germany . |
| 565811 | 11/1944 | United Kingdom . |

*Primary Examiner*—Gerald P. Tolin

*Attorney, Agent, or Firm*—Thomas N. Ljungman

[57] ABSTRACT

A modular electrical-energy distribution system has at least one conductor and a contacting device which makes it possible to establish, at essentially any point in the conductor system, a contact with the conductor. The tap or contacting devices essentially clamp onto or between conductor bars and therefore essentially permit all contacts to be made simply from one side of the conductor bars thereby reducing installation time.

4 Claims, 9 Drawing Sheets

FIG. 3
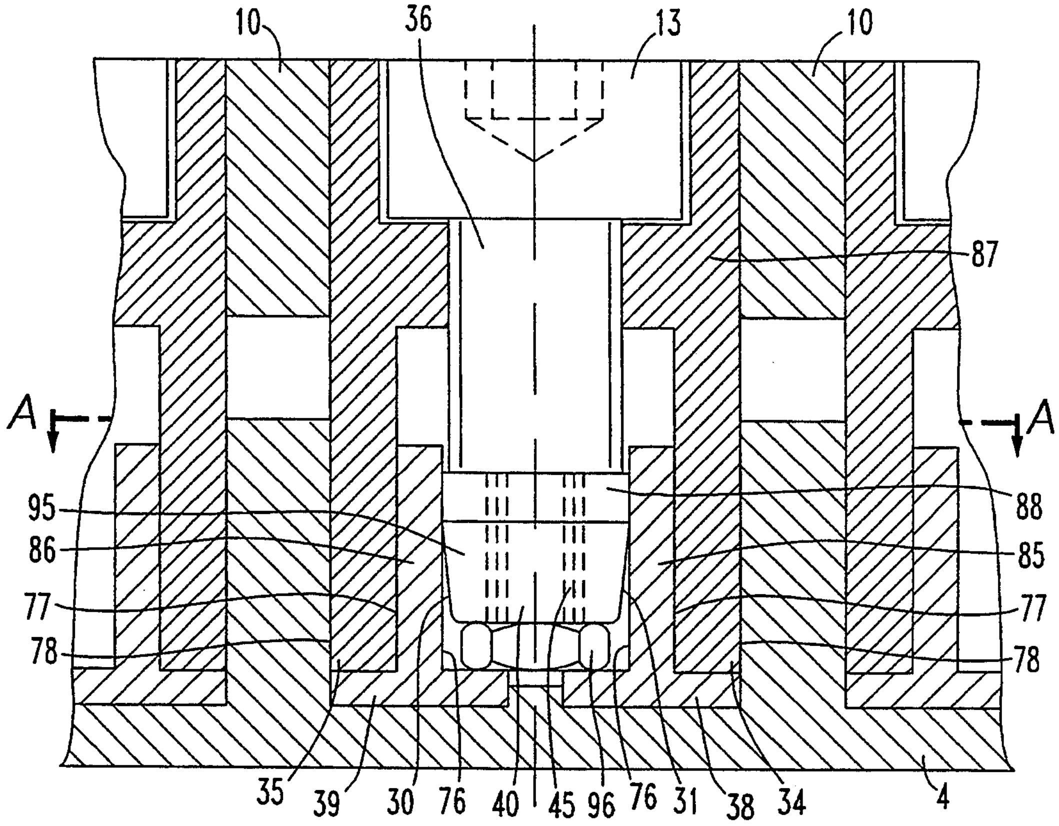
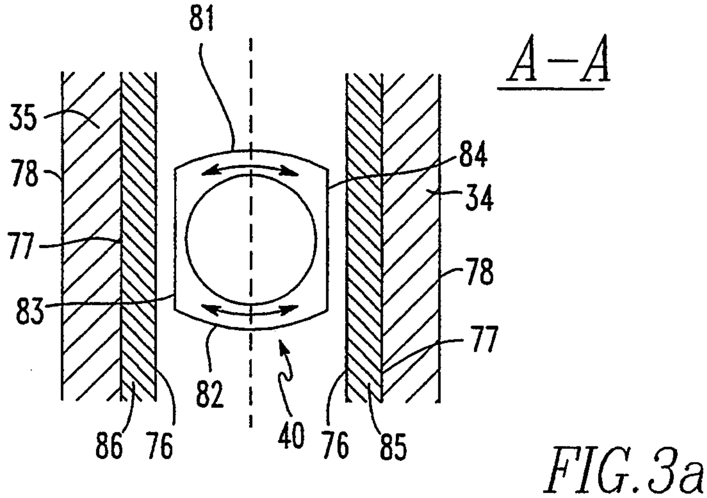
FIG. 3a

FIG. 4
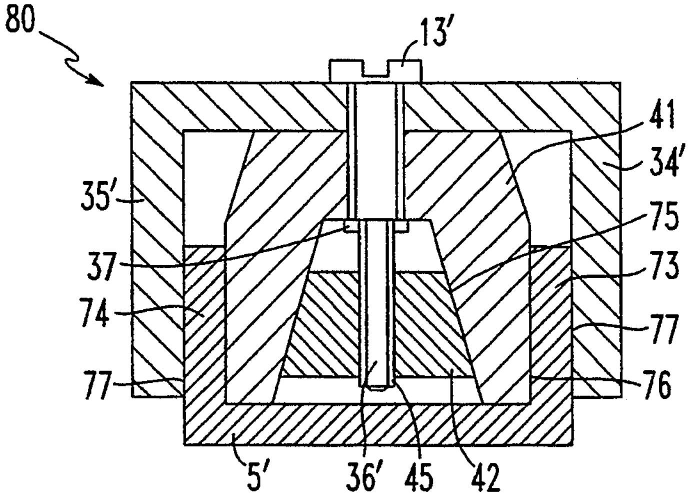
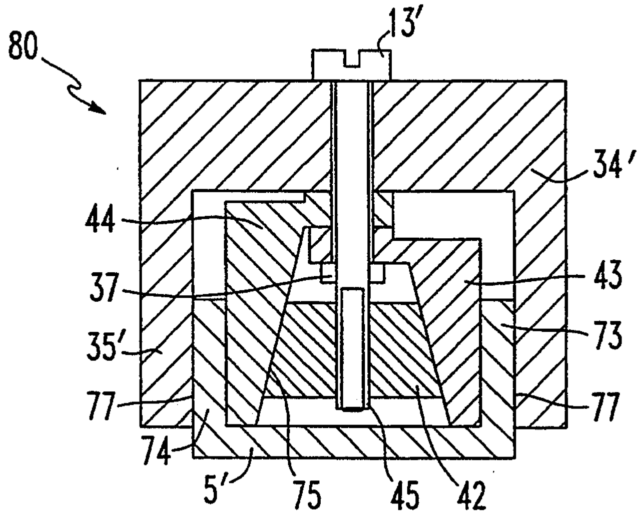
FIG. 5

FIG. 6
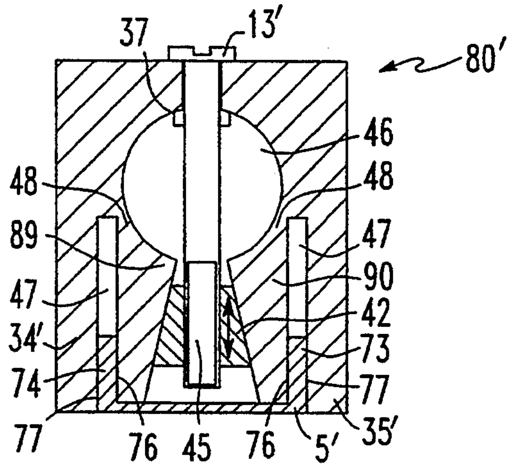
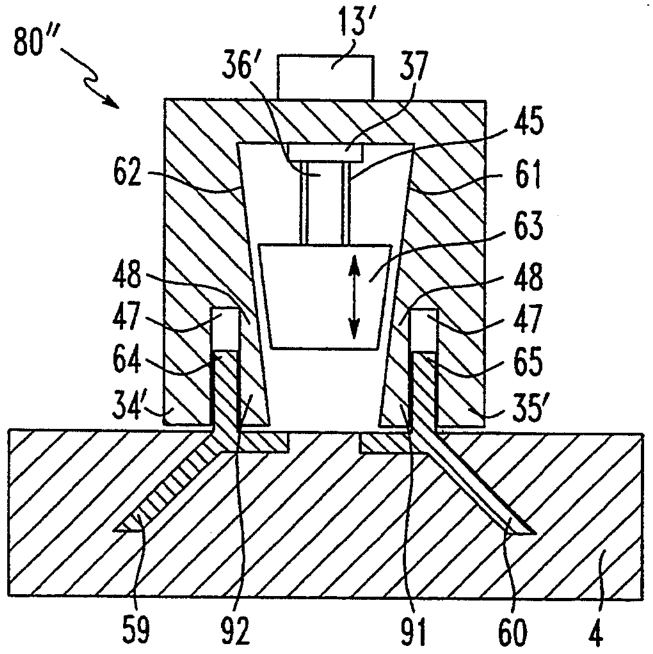
FIG. 7

ELECTRICAL ENERGY DISTRIBUTION SYSTEM

CONTINUING APPLICATION DATA

This application is a continuation-in-part application of International Application No. PCT/DE92/00092, filed on Feb. 5, 1992, which claims priority from Federal Republic of Germany Patent Application No. P 41 10 251.7, filed on Mar. 28, 1991. International Application No. PCT/DE92/00092 was pending as of the filing date of U.S. application Ser. No. 08/127,957 and the U.S. was an elected state in International Application No. PCT/DE92/00092.

BACKGROUND OF THE INVENTION

1. Field of the Invention

This invention generally relates to an electrical energy distribution system. A typical electrical energy distribution system may have a number of longitudinal conductors or conductor systems. Further, the distribution system may include modular components which can be bonded to, or put into contact with the conductors, at positions along the longitudinal conductor or conductor system by means of a special contact. More particularly, the invention relates to component conductors running parallel to one another in the longitudinal direction of the distribution system.

2. Background Information

Unexamined European Patent Application 0 330 525 discloses a system which has conductors running in the longitudinal direction inside a metallic shell. These conductors are provided for different current intensities, and they have a U-shaped cross section. It is possible to insert branching boxes at regular intervals along the shell in prepared openings. These branching boxes can be used, for example, to feed low-amperage devices. The contacting is achieved by means of spring contact terminals in contact with the U-shaped conductors in the raceway.

An additional installation system in which adapters for end users can also be inserted at fixed intervals into an existing raceway is disclosed in European Patent Specification 0 407 241.

A power distribution system for cables is disclosed by Unexamined European Patent Application 0 299 811. Here too, the contacting is achieved by means of spring contacts.

Unexamined European Patent Application 0 413 242 discloses an electrical power distribution system for modular units. However, the modular units can only be inserted at prepared locations along the raceway system.

A bus bar system with several conductors routed in a raceway is disclosed in German Laid Open Patent Application No. 32 38 483. In this system, the conductors are surrounded on all sides by electrically insulating material, and are thus sufficiently protected against contact. For the connectors used to achieve the contacting to the conductors, there are openings in the insulating material at predetermined positions, which openings can be activated easily and without the use of tools.

German Laid Open Patent Application No. 24 05 049 discloses an energy distribution system which is designed for high continuous currents, in particular for power distribution systems for high-rise buildings. As such, this system essentially provides vertically ascending bus bars. The use of this system significantly reduces the manual work required for installation. The various sections on the individual floors are connected to one another by means of corresponding connecting elements.

A multiple bus bar system with a housing is disclosed in German Utility Model 79 18 946, and can be inserted in raceways. These individual conductors are separated from one another by insulating webs located on the floor of the housing, and are simultaneously able to be connected to the desired end users by means of a plug-and-socket connector. This system, however, essentially cannot be used for power systems and equipment.

German Patent Publication Published for Opposition Purposes No. 23 01 460 discloses a separable bus bar system, thus creating a bus bar system which requires a minimum of structural means, assembly and installation time.

European Laid Open Patent Application No. 0 345 910 discloses a bus bar having preferably C-shaped profile cross sections. This bus bar is essentially for use in busway systems, switchgear, substations, etc.

German Laid Open Patent Application No. 38 11 456 discloses a bus bar system in which electrical conductors are exposed over their entire length, and therefore allow contacting at any desired point.

A similar system is disclosed in German Laid Open Patent Application No. 38 11 458. Bus bars running parallel to one another are embedded in an insulated support, which insulated support is provided with recesses and is plate-shaped. These bus bars also allow the contacting of adapters at any desired point. The adapters required for such bus bars are disclosed in German Patent No. 36 42 518. A fused connection of the installation device with the bus bars located underneath them is achieved by placing an adapter housing on the bus bars, in which, oriented to the bus bars, a contact bar is fastened with adjustable terminal bodies. These terminal bodies can be mechanically braced against the contact bars, and thus guarantee a conductive electrical connection.

A contacting connector like the one preferably used for bus bars, is disclosed in German Utility Model No. 19 04 072. The contacting connector essentially consists of cone-shaped terminal pieces which are pressed against the bus bars by tightening a connecting screw.

An additional German Utility Model 90 05 168 discloses a connection which is made by means of clamping pieces between two electrical conductors, thereby producing an energy distribution system.

The manner of realization of electrical connections between printed circuit board segments end-to-end with one another is disclosed in German Utility Model 17 97 821.

European Laid Open Patent Application No. 0 391 100 discloses a tap-off unit for bus bar systems. In this unit, connecting pieces projecting out of a housing are used for connections to the bus bars located underneath. As a result of the use of this tap-off unit, during installation of the unit, there is no great danger, for the personnel performing the contacting process, of coming into contact with live bus bars.

German Utility Model 86 02 883 discloses energy distribution systems which are located inside cable raceways. In this case, an adapter to tap the electrical lines is inserted inside the raceway under a continuous cover. It is also possible to place a tap on the cable raceway cover, although its contacting is located inside the raceway.

A plug-in current distribution apparatus is disclosed by German Laid Open Patent Application No. 39 24 045. This current distribution apparatus provides an easy and rapid connection between the current feed and the devices to be connected electrically. But this system is suitable only for low current intensities and for data transmission lines.

OBJECT OF THE INVENTION

The object of the present invention is to create an electrical energy distribution system in which, at any desired location and regardless of the shape or form of the electrical conductor, it can be possible to insert an adapter, and thus, contact the conductors, which conductors can be disposed in a channel, with longitudinally running individual parallel conductors, or in a control cabinet. At the same time it must also be possible, using adapters, to connect switchgear or other end user devices to the existing conductor system.

SUMMARY OF THE INVENTION

This object is achieved by the present invention which provides a basic installation system while maintaining a high level of safety. In one embodiment, there are preferably five conductors running parallel to one another. These conductors can either be laid freely, or installed in a raceway. When installed in a raceway, the conductors can be separated from one another by insulation means. In the system according to the present invention, each electrical conductor preferably has at least two legs running parallel to one another. The conductors can preferably be contacted with a tap terminal or a contact cross-bar that either fits between, or fits over the two legs. The contacting, e.g. with a U-shaped or two T-shaped conductors running parallel to one another and perpendicularly with respect to a support structure, can be made by means of a straddling contact cross-bar which spreads a clamping piece when a mechanism located within the cross-bar is activated. Thus, contact between the cross-bar and the conductor at essentially any desired point along the conductor can be possible.

Essential components of the invention are the straddling of the outsides of the two parallel legs of the conductor, and the application of a sufficient clamping force by means of suitable spacers on the inside of the corresponding conductor legs. This type of contacting essentially avoids placing any load on the insulation material.

The individual spreaders or contact bridges can thereby be combined in a modular adapter, which is insertable as a unit on or in the raceway. Such an adapter can have activating mechanisms which enable the individual conductors to be contacted with the taps of the adaptor after the insertion of the adapter onto the raceway. This configuration essentially makes it possible for the adapter to be inserted at essentially any desired point of the raceway. In an additional configuration of the invention, it is possible to use prefabricated modular units which incorporate such an adapter module thereinto. These modular units can contain, for example, branch circuits, crossings, substations, FI (or fault current.) switches, power supplies, fuses, switches or indicator lights. The use of the devices according to the present invention significantly reduces the time required to assemble and install electrical distribution systems on site.

In one configuration of the invention it essentially does not make any difference whether the modules are inserted inside a raceway, i.e. inside a cover, or with their controls projecting outside a cover, as further delineated below. These embodiments are determined as a function of the individual application, i.e. either a relatively flat raceway with end user modules installed in insulation boxes, or a relatively high raceway, from which only the operating elements, or controls, of the modules project. As a result of these various possibilities, the advantage of the electrical energy distribution system according to the present invention is that the system provides a basic installation system with a built in level of safety. Such a system can thereby be appropriate for use in particular applications, e.g. medical technology, laboratory technology, or other areas with lower safety requirements or with a lower fault current.

Any branch distribution devices, as noted above, can preferably be installed by means of a modular adaptor at any desired point either in or on the basic installation raceway. From these branch connections, naturally, an appropriately smaller raceway or an additional basic installation system can be continued, which in turn makes it possible to install additional branches or crossings. This system makes it possible to avoid additional high installation costs, and creates a flexible installation system. This system can also be installed in columns, whereby the installer can perform the installation directly on the site, as a function of the client's wishes.

In summary, one aspect of the invention resides broadly in a busbar system for distributing electrical energy. The busbar system comprises: a busbar conductor device for conducting electrical energy, the busbar conductor device having a first surface thereon, and a second surface thereon opposite to the first surface; and a tap device for providing a branch electrical pathway from the busbar conductor device, the tap device being engagable and disengagable with the busbar conductor device. The tap device comprises: a first projection extending therefrom, the first projection having a first surface thereon, and the first surface of the first projection for being disposed adjacent to and in contact with the first surface of the busbar conductor device; apparatus for pressing the first surface of the busbar conductor device into engagement with the first surface of the first projection of the tap device, the apparatus for pressing being spaced apart from the first projection of the tap device, and the apparatus for pressing being configured for being disposed adjacent the second surface of the busbar conductor device. The apparatus for pressing comprises a rotatable portion, with the rotatable portion comprising a first position for being adjacent the second surface of the conductor device, the rotatable portion in the first position comprising a first surface portion for being spaced apart from the second surface of the conductor device; and a second position for being adjacent the second surface of the conductor device, the rotatable portion in the second position comprising a second surface portion for pressing the first surface of the conductor device into engagement with the first surface of the first projection of the tap device upon rotation of the rotatable portion. The tap device also comprises an apparatus for rotating the rotatable portion between the first and second positions.

Another aspect of the invention resides broadly in a busbar system for distributing electrical energy, wherein the busbar system comprises: a busbar conductor device for conducting electrical energy, the busbar conductor device comprising first and second leg portions, the first and second leg portions being disposed parallel to one another and spaced apart from one another by a first distance, each of the first and second leg portions having a first end portion and a second end portion disposed opposite to the first end portion, the first end portion of each of the first and second leg portions being disposed in fixed relationship to the first end portion of the other of the first and second leg portions, and each of the first and second leg portions having a first surface thereon, and a second surface thereon opposite to the first surface, the first and second surfaces extending substantially from the first end portion to the second end portion, and the first surface of each of the first and second leg portions being disposed towards the first surface of the other of the first and second leg portions; a tap device for providing a branch electrical pathway from the busbar conductor device, the tap device being engagable and disengagable with the busbar conductor device. The tap device comprises: a U-shaped portion, the U-shaped portion having a base part with first and second arm portions extending from the base part and spaced apart from one another by a second distance, the second distance being greater than the first distance for insertion of the U-shaped tap device over the first and second leg portions of the busbar conductor device, the first and second arm portions each comprising a first end disposed away from the base part, the first arm portion having a first surface for being disposed adjacent to and in contact with the second surface of one of the first and second leg portions, and the second arm portion having a surface for being disposed adjacent to and in contact with the second surface of the other of the first and second leg portions; and a wedge device disposed between the first and second arm portions, the wedge device being configured to be disposed between the first and second leg portions of the busbar conductor device upon insertion of the U-shaped portion of the tap device over the first and second leg portions to press the wedge device against the first surface of the first and second leg portions to press the second surface of the first and second leg portions into engagement with the first surface of the first and second arm portions of the tap device.

A still further aspect of the invention resides broadly in a busbar system for distributing electrical energy, wherein the busbar system comprises: busbar conductor device for conducting electrical energy, the busbar conductor device comprising a U-shaped busbar, and the U-shaped busbar comprising a base portion with first and second leg portions extending from the base portion, the first and second leg portions being disposed parallel to one another and spaced apart from one another by a first distance, each of the first and second leg portions having a first end portion adjacent the base portion and a second end portion disposed opposite to the first end portion, each of the first and second leg portions having a first surface thereon, and a second surface thereon opposite to the first surface, the first and second surfaces extending substantially from the first end portion to the second end portion, and the first surface of each of the first and second leg portions being disposed towards the first surface of the other of the first and second leg portions; and tap device for providing a branch electrical pathway from the busbar conductor device, the tap device being engagable and disengagable with the busbar conductor device. The tap device comprises: a U-shaped portion, the U-shaped portion having a base part with first and second arm portions extending from the base part; the first and second arm portions being disposed spaced apart from one another, the first and second arm portions each comprising a first end disposed away from the base part, the first aeon portion having a surface for being disposed adjacent to and in contact with the second surface of one of the first and second leg portions, and the second arm portion having a surface for being disposed adjacent to and in contact with the second surface of the other of the first and second leg portions; an inner member disposed between the first and second arm portions, the inner member having a base portion disposed adjacent the base part of the U-shaped portion, the inner member comprising first and second arm portions extending away from the base portion of the inner member, the first and second arm portions of the inner member being disposed in alignment with and spaced apart from the first and second arm portions of the U-shaped portion, and the first and second arm portions of the inner member each having a first end disposed away from the base part of the U-shaped portion, the first arm portion of the inner member having a corresponding first surface for being disposed adjacent to and in contact with the first surface of one of the first and second leg portions, and the second arm portion of the inner member having a corresponding first surface for being disposed adjacent to and in contact with the first surface of the other of the first and second leg portions, the first and second arm portions of the inner member each having a second surface disposed opposite to the corresponding first surface; and wedge device disposed between the first and second arm portions of the inner member adjacent the second surface of the first and second arm portions of the inner member, the wedge device being configured to be movable between the first and second arm portions of the inner member to press the first and second arm portions of the inner member into engagement with the first and second leg portions of the busbar conductor device and press the first and second leg portions of the busbar conductor device into engagement with the first and second arm portions of the U-shaped portion of the tap device.

BRIEF DESCRIPTION OF THE DRAWINGS

The invention is explained below in greater detail with reference to the embodiments illustrated in the accompanying drawings, in which:

FIG. 3 depicts an installation system in cross section with split T-shaped conductors and clamping capability of the conductor;

FIG. 3*a* is a plan view taken along line A—A of FIG. 3;

FIG. 4 shows, in cross section, a plugged in contact cross-bar with conductor and spreading capability;

FIG. 5 shows, in cross section, a plugged in contact cross-bar with conductor and spreading capability;

FIG. 6 shows, in cross section, a plugged in contact cross-bar with conductor and spreading capability;

FIG. 7 shows, in cross section, a plugged in contact cross-bar with conductor and spreading capability;

DESCRIPTION OF THE PREFERRED EMBODIMENTS

Figure 1:
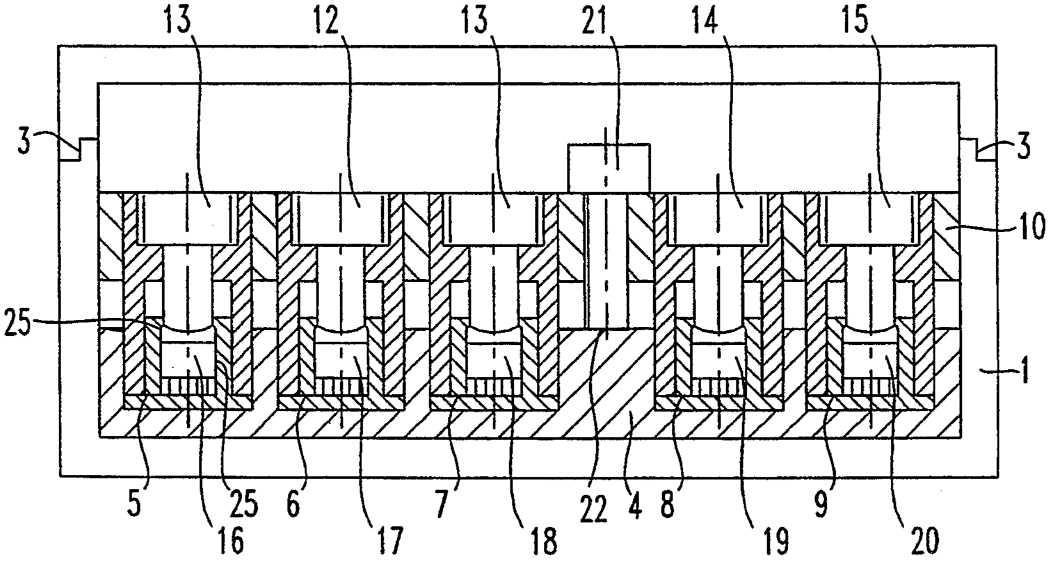
FIG. 1 shows an installation system in cross section with U-shaped conductors and clamp connections from the inside.
Figure 1A:
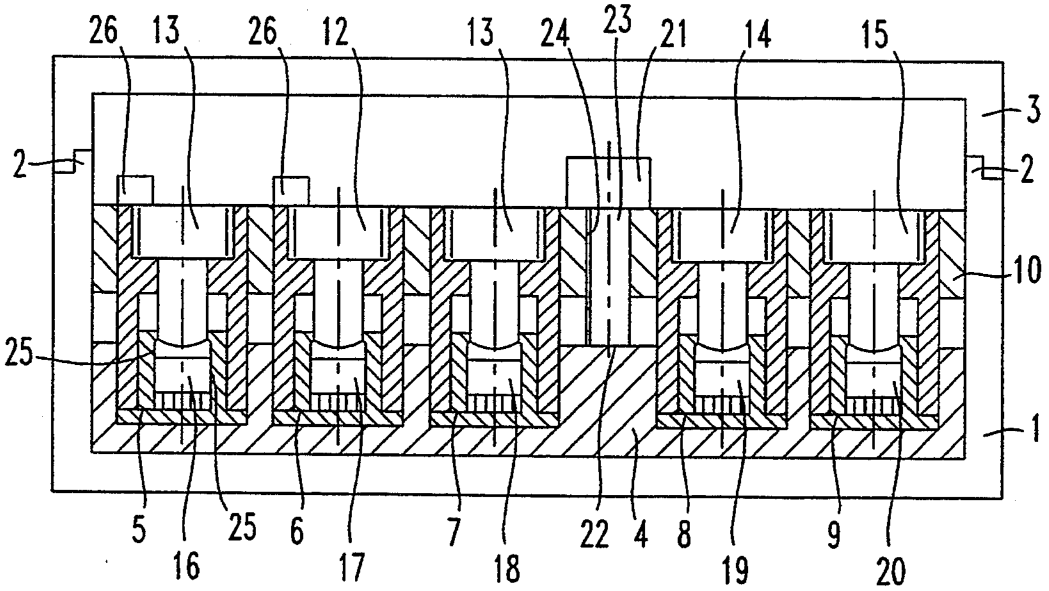
FIG. 1*a* shows the installation system of FIG. 1 with additional features added thereto.

The embodiment illustrated in FIGS. 1 and la show a cross section taken through a longitudinally running raceway. The raceway preferably has a housing which can be formed from a bottom part 1. A typical raceway can preferably have either a single conductor or a plurality of conductors. The depicted embodiment of the present invention, however, will be discussed with reference to the system of FIGS. 1 and 1*a*, wherein there are five conductors present, while not intending to limit the present invention to only five conductors. In the embodiments of FIGS. 1 and 1*a*, there are preferably general conductors 5, 6 and 7, as well as a neutral conductor 8 and an equipment grounding conductor 9. Each of the conductors 5–9 can preferably be at least partially embedded in insulating material 4 at the base of the bottom part 1 of the housing. The individual conductors 5–9 are preferably arranged at a defined contact spacing, which spacing can be chosen as a function of the current intensities used. At least a portion of the conductors 5–9 can preferably be embedded in an insulating material 4 so that the conductors 5–9 can preferably be permanently fastened in place within the housing. Such an insulating material, may be, for example, a thermosetting plastic which can be molded about the conductor 5, and is generally well known in the field, and therefore is not described in any further detail herein.

Figure 8:
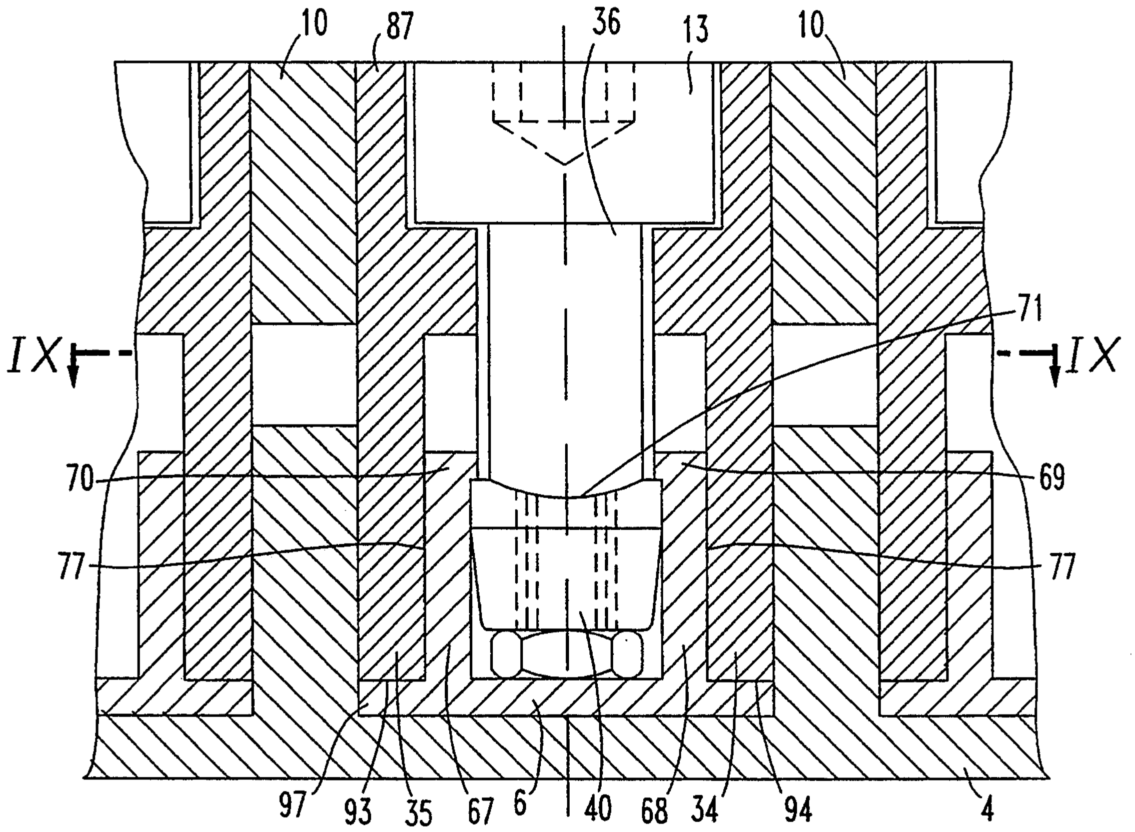
FIG. 8 shows an installation system in cross section with U-shaped conductors and clamping capability from the inside.

The conductors 5–9 can preferably be designed, in their cross section, so that for each electrical conductor, there are preferably at least two contact legs extending from a base portion thereof, with the contact legs preferably running essentially parallel to one another. Throughout the figures, the contact legs are essentially labelled by the following reference numbers: 32 and 33 (FIG. 2), 85 and 86 (FIG. 3), 73 and 74 (FIGS. 4, 5 and 6), 64 and 65 (FIG. 7), 67 and 68 (FIG. 8). If a tap for a power take off or switching device, is to be inserted at any point along the raceway, such a tap, can essentially be designed as a modular adapter 10 which can preferably be installed in the raceway to provide electrical connections to the conductors 5–9.

Such a modular adaptor 10 can preferably have contact studs 16, 17, 18, 19 and 20 (also generally represented as 40 in FIGS. 3, 3*a* and 8) located at essentially the same distance from one another as the distance between the conductors 5–9. Upon insertion of the modular adaptor 10 into the base 1 of the housing, the contact studs 16–20 preferably engage corresponding ones of the conductors 5–9 disposed respectively below the contact studs 16–20. By activating, or tightening, the fasteners 12, 13, 14 and 15, a pressure can then preferably be exerted on the contact studs 116–20, and in the terminal area of the contact studs, that is, at contact surfaces 25, there can preferably be a contacting between the contact studs 16–20 and the contact legs of the conductors 5–9. In this manner, a reliable contacting can be achieved.

The modular adapter 10 can generally be retained in, and spaced a proper distance from the conductors 5–9 by means of what could be termed a "rack-out", or connection device 21. Such a rack-out device 21 may possibly be a simple bolt or pin which has a shaft 23 that engages appropriate means in the insulating material 4 to hold the modular adaptor 10 in place. As such, this shaft 23 may preferably have threads 24 for threading the shaft into an appropriate receptacle. This rack-out device 21 may also preferably have a pressure contact surface 22 for contacting the insulating material 4 to thereby provide a proper spacing between the modular adapter 10 and the insulating material 4.

If the connection provided by the contact studs 16–20 and contact legs of the conductors 5–9 is to be disconnected, the fasteners 12–15 can preferably be loosened in the opposite direction from the direction in which they were tightened. The modular adapter 10 can then be removed by means of a rack-out, or disconnect device 21.

To provide protection against accidental contact with the conductors from above, the raceway can be securely closed by means of an upper part of the housing 2 and a housing cover 3.

The modular adapter 10 may also preferably have cable connection devices 26 disposed in conjunction with each contact stud 16–20 to thereby provide an electrical take-off path from the conductors 5–9, via the contact studs 16–20. Such cable connections 26 may be of any type of known cable connection such as a socket into which a bare cable end can be inserted an retained.

Figure 2:
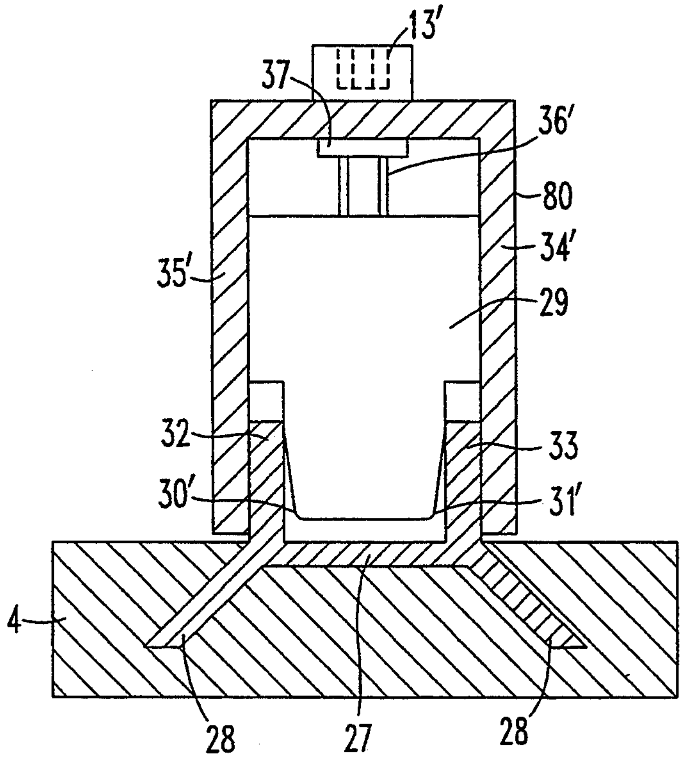
FIG. 2 shows a plug-in contact in cross section.

An alternative type of contacting between the conductors 5–9 of the raceway and the contact studs 16–20 of the modular adaptor 10 is illustrated in FIG. 2. As illustrated, a conductor 27 (which could essentially be any one of conductors 5–9 of FIG. 1) may preferably have at least two angularly disposed legs 28. The conductor 27 can then preferably be anchored into the insulation material 4 by molding the insulation material 4 directly about the anchor legs 28. The contact legs 32 and 33 of the conductor 27 can preferably project out of the insulation material, 4 in a direction which can preferably be perpendicular to, or essentially vertically away from, the insulation material 4, so that the contact legs 32 and 33 are preferably parallel to one another. A contact cross-bar 80 can preferably be plugged into, or inserted over, the exposed contact legs 32 and 33. The contact cross-bar 80 can preferably be U-shaped with legs 34′ and 35′ extending therefrom to preferably receive the contact legs 32 and 33 therebetween.

Inside the U-shaped contract cross-bar 80 there can preferably be a contact stud 29, which can be moved in the direction parallel to the legs 34′ and 35′, or towards and away from the conductor 27. This contact stud can preferably be moved by means of a shaft 36′ which is connected through the contact cross-bar 80 to a fastener 13′. The shaft 36′ is preferably disposed through the contact cross-bar 80 to connect the shaft 36′ to the fastener 13′. The contact stud 29 can preferably have an internal threaded bore (not shown) to accept the threaded shaft 36′ therein. Since the contact stud 29 is essentially unable to rotate, the displacement of the contact stud 29 in the vertical direction can be brought about by rotating the fastener 13′ to turn the shaft 36′ within the contact stud 29 to move the contact stud 29. Thus, by means of the inter-reacting threaded portions, and the inability of the contact stud 29 to rotate, the contact stud 29 can be raised and lowered in the direction substantially perpendicular to the insulation material. 4.

On the underside of the U-shaped contact cross-bar 80, that is, the side opposite the fastener 13', there is preferably a mounting device 37. Such a mounting device 37 essentially should prevent the loosening of the shaft 36', while simultaneously allowing the shaft 36' to rotate. One such type of device which can preferably be used for this purpose is a Seger ring. If the fastener 13' is activated, then the contact stud 29 in the contact cross-bar 80 can be guided towards the base of the conductor 27, or away therefrom.

In the lower portion of the contact stud 29 there are preferably conically tapering, trapezoid-shaped surfaces 30' and 31'. As the contact stud 29 is displaced towards the base of the conductor 27, the surfaces 30' and 31' are essentially pressed into the space between the vertically upright contact legs 32 and 33. Consequently, when the pressure is increased, the contact legs 32 and 33 press against the legs 34' and 35' of the contact cross-bar 80. In this manner, a fused contacting between the contact cross-bar 80 and the conductor 27 can be achieved. With such an arrangement, the fused contacting is not achieved by means of the insulation material 4.

Another type of contacting between the conductors and the modular adapter 10 is illustrated in FIGS. 3 and 3*a*. Here again, the contact pressure on the conductors 38 and 39 is preferably not exerted by the insulation material 4. This type of fastening can therefore also be used for exposed conductors.

As shown in the illustrated embodiment of FIG. 3, each of the conductors 38 or 39 can be T-shaped, and preferably the conductors 38 and 39 are arranged in pairs for reasons of symmetry. Such paired conductors 38 and 39 can essentially be used as a substitute for any one of the conductors 5–9 as illustrated in FIGS. 1 and 1*a*, or even the conductor 27 as depicted in FIG. 2. The conductors 38 and 39 are preferably embedded in the insulation material 4 to fixedly retain the conductors 38 and 39 in place. The conductors 38 and 39 preferably have contact legs 85 and 86 projecting out of the insulation material 4.

In this embodiment, the contact legs 85 and 86 are preferably covered by a contact cross-bar 87, which can have an H-shaped cross sectional configuration as shown in FIG. 3. Within the contact cross-bar 87, such as in a bore thereof, there can be, in turn, a fastener 13 which can preferably be coupled by means of a shaft 36 to a contact stud 40. In this embodiment, the contact stud 40 can preferably be permanently connected to the shaft 36 to allow rotation of the stud 40 when the shaft 36 is rotated. For example, the contact stud 40 could be threaded onto the shaft 36 by means of threads 45, and then locked into place by threading an additional nut 96 onto the shaft 36.

The contact stud 40 is preferably turnable within the space between the conductors 38 and 39. The contact stud 40, as shown, has, in its upper portion, a collar 88 for clamping with a conically shaped lower portion 95 connected to the collar 88. The collar 88 can preferably have two bevelled sides 83 and 84, preferably running parallel to one another, and parallel to a center axis (dashed line) of the collar 88.

In the embodiment illustrated in FIG. 3*a*, after the modular adapter 10 (discussed previously with respect to FIG. 1) is first placed on the conductors 38 and 39, a simple rotation of the fastener 13 would preferably result in the contact stud 40 being turned to press the pressure surfaces 81 and 82 against the contact surfaces 76 of the vertical contact legs 85 and 86 of the conductors 38 and 39. As a result of this pressure exerted on surfaces 76, the pressure is simultaneously transmitted via the contact legs 85 and 86 to the contact surfaces 77. From the surfaces 77, the contact pressure can be transmitted via the cross-bar legs 34 and 35 to the insulation material 4 at contact surfaces 78. Such an arrangement essentially allows for proper contact between the conductors 38 and 39 and the contact cross-bar 87 of modular adapter 10, as the cross-bar legs 34 and 35 are essentially clamped in place between the contact legs 85 and 86 and the insulation material 4 by the contact legs 85 and 86.

The embodiment illustrated in FIG. 4 offers an additional contacting possibility. This embodiment has a U-shaped conductor profile 5'. However, this type of contacting can be used on other shapes of conductors such as T-shaped, rectangular or even L-shaped conductors, some of which are discussed, and shown in the accompanying figures. Here again, a contact cross-bar 80, which can be U-shaped as shown, (or possible even H-shaped as depicted in FIG. 3) can preferably be placed over the conductor 5' with the legs 34' and 35' straddling the U-shaped legs 73 and 74 of the conductor 5'.

In the illustrated embodiment of FIG. 4, there is preferably a clamping member 42 threaded onto the shaft 36' by means of the threads 45. In a similar manner as discussed with reference to the contact stud 29 in FIG. 2 above, a pressure can be exerted by the clamping member 42 by rotating the fastener 13' to move the clamping member 42, which itself is unable to rotate. In this case, however, the pressure exerted by rotating the fastener 13' is not exerted directly on the legs 73 and 74 of the conductor, but is essentially exerted onto a contact member 41 located between the conductor legs 73 and 74 and the clamping member 42. The clamping member 42 can preferably have a trapezoidal shape, and is preferably configured to fit entirely within a hollowed inner portion of the contact member 41, which contact member 41 preferably has a correspondingly trapezoid-shaped inner surface.

Thus, as a result of the rotational movement of the fastener 13', the clamping member 42 can be moved vertically towards the fastener 13', and can thus exert an indirect pressure on the contact surfaces 77 between the legs 73 and 34' and the legs 74 and 35'. In other words, the clamping member 42 first exerts pressure on contact surfaces 75 between the clamping member 42 and the contact member 41. This pressure is then exerted, via contact member 41, onto contact surfaces 76 between contact member 41 and conductor legs 73 and 74. The pressure is then transmitted, via conductor legs 73 and 74, to the contact surfaces 77.

The contact member 41, illustrated in the embodiment of FIG. 4, is essentially shown as a one-piece member. However, the embodiment illustrated ill FIG. 5 depicts a two-piece contact member having parts 43 and 44. The contacting between the conductor 5' and the contact cross-bar 80, in this embodiment, as with the one-piece member 41 above, can also preferably be achieved by turning the fastener 13' to push the clamping member 42 against the contact surfaces 75 to thereby spread the parts 43 and 44 arid exert a pressure on the contact legs 73 and 74.

FIG. 6 illustrates another configuration of the object of the invention, with an additional type of contacting between the conductor and the contact cross-bar. In this embodiment, a contact cross-bar 80′ is placed over a preferably U-shaped conductor 5′. However, as an alternative to the separate contact member 41 or the pair of 43 and 44, as described above with reference to FIGS. 4 and 5, the embodiment of FIG. 6 provides that the contact members can preferably be molded integrally with the contact cross-bar 80′ to provide the integrally molded contact legs 89 and 90. Such an embodiment preferably has groove-shaped recesses 47 in the contact cross-bar 80′. The legs 73 and 74 of the conductor 5′ can then preferably fit into these recesses 47.

In order to provide a clamping action, the contact cross-bar 80′ can preferably be configured with a space 46 disposed within the contact cross-bar 80′. This space 46 can preferably be disposed through the contact cross-bar 80′ in a direction running substantially parallel to the conductor 5′. Between the space 46 and the groove 47, there can then preferably be an area 48 of reduced cross section. This reduced cross section area 48 essentially makes the contact legs 89 and 90 sufficiently flexible, or movable so that the contact legs 89 and 90 can transmit the pressure exerted by the clamping member 42 onto the contact surfaces 76 between the legs 73 and 90, and the legs 74 and 89. From the contact surfaces 76, the pressure is then preferably transmitted via conductor legs 73 and 74 to contact surfaces 77 between the legs 73 and 35′, and the legs 74 and 34′.

In this embodiment of FIG. 6, the clamping member 42 can preferably also have a trapezoid shape and can fit into a recess inside the contact cross-bar 80′ and having essentially similar contours as the clamping member 42. By means of the fastener 13′, a rotational movement can also be executed in the present embodiment to cause a motion of the clamping member 42 by means of the thread 45 in the clamping member 42. Thus, the contact pressure can be increased or decreased by activating the fastener 13′.

In each of the embodiments previously described, or embodiments to be described further below, it should be understood that the legs of the contact cross-bar should preferably be designed and sized so that the cross-bar legs are able to withstand the pressure occurring from the inside. In other words, there should preferably not be any significant bending of the legs of the contact cross-bar when subjected to a pressure from the inside, as such could possibly result in decreased contact area between the cross-bar legs and the conductor legs.

On the embodiment illustrated in FIG. 7, essentially analogous to FIG. 6, the contact cross-bar 80″ has grooves 47 in the vicinity of the contact cross-bar legs 34′ and 35′. However, in the inner area of the contact cross bar 80″, the legs 34′ and 35′ of the contact cross-bar 80″ preferably have bevels 61 and 62, which can taper toward the ends of the legs of the contact cross-bar 80″. Anchored inside the insulation material 4 are preferably two conductors 59 and 60, which can be engaged with their projecting legs 64 and 65 in the grooves 47 of the contact cross-bar 80″. In turn, a vertically movable clamping member 63 can be located in the inner area of the contact cross-bar 80″. Thins clamping member 63, on its external sides, also preferably has bevelled edges which match the bevels 61 and 62 of the contact cross-bar 80″. In the embodiment of FIG. 7, the clamping member 63 can also preferably be trapezoidal as discussed above with reference to the clamping member 42, however, the clamping member 63 is essentially disposed on the shaft 36′ with its bevels in an opposite direction to the direction of the bevels of the member 42.

On account of the central positioning of the clamping member 63, the clamping member 63 can be moved vertically by means of the fastener 13′. As discussed previously, the clamping member 63 can preferably be inhibited from rotating within the recess, so that, by means of the threaded portion 45 of shaft 36′, a simple rotation of the fastener 13′ can raise and lower the clamping member 63, thereby altering the outwardly applied pressure being applied on the legs 91 and 92. The shaft 36′, as was previously discussed can preferably be held on the contact cross-bar 80″ by means of a mounting 37.

As a result of the pressure exerted by the clamping member 63, the inner legs 91 and 92 of the contact cross-bar legs 34 and 35 can be pressed against the conductor legs 64 and 65 to essentially clamp the conductor legs 64 and 65 within the slots 47.

FIG. 8 essentially shows an enlarged view of the embodiment as illustrated in FIGS. 1 and 1*a*. In this embodiment, the legs 67 and 68 of the conductor 6 can preferably have projections 69 and 70 in a terminal area of the legs, which projections 69 and 70 preferably extend toward one another. Contact cross-bar 87 preferably has legs 34 and 35. Contact legs 67 and 68 of the conductor 6 can preferably be pressed into engagement with the legs 34 and 35 by means of the specially designed contact stud 40. The contact cross-bar 87 preferably has a rotatable fastener 13, which can preferably be connected by means of the shaft 36 to the contact stud 40.

This contact stud 40 can preferably be designed so that the contact stud 40 exerts both a vertical and a horizontal pressure on the conductor 6 to thereby pull the cross-bar 87 into a tighter vertical engagement with the base 97 of the conductor at the surfaces 93 and 94. The manner in which the horizontal contact pressure is exerted has previously been explained with reference to FIG. 3. The vertical pressure, however, is essentially due to a curved head 71 of the contact stud, which curved head 71 can be engaged under the projections 69 and 70. A vertical contact pressure can be exerted on the contact surfaces 93 and 94 as the stud 40 is turned within the conductor 6 thereby causing the projections to engage the curved surface 71 and pull the stud 40 into the conductor 6, which pulling force exerts a vertical pressure on the surfaces 93 and 94. This type of contacting is appropriate in particular for use with very high current intensities.

Figure 9:
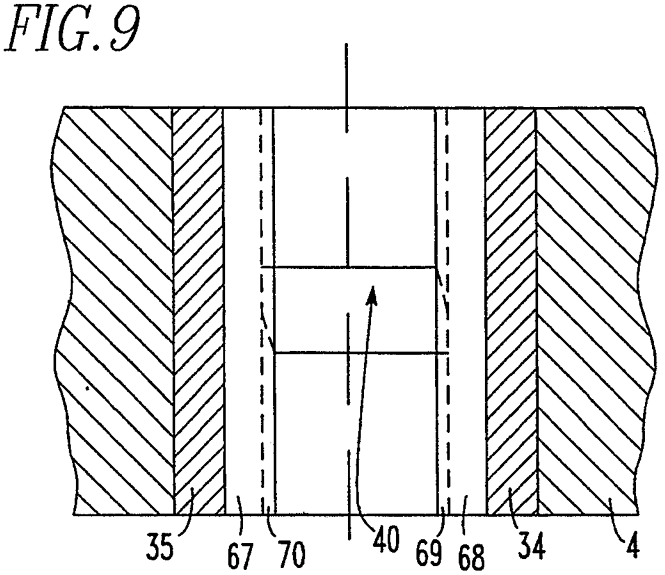
FIG. 9 and 9*a* show alternative views taken along lines IX—IX of FIG. 8.
Figure 9A:
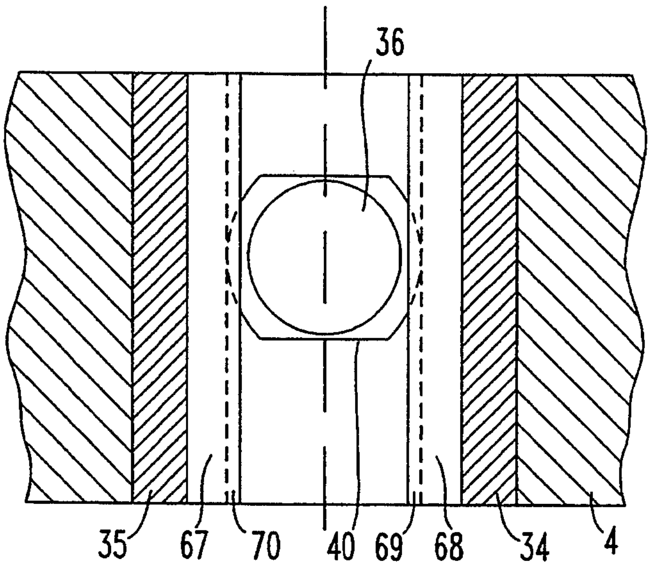

FIG. 9 and 9*a* essentially show alternative views taken along line IX—IX of FIG. 8, showing the stud 40 in what could be termed a "locked-in" position under the projections 69 and 70.

Figure 10:
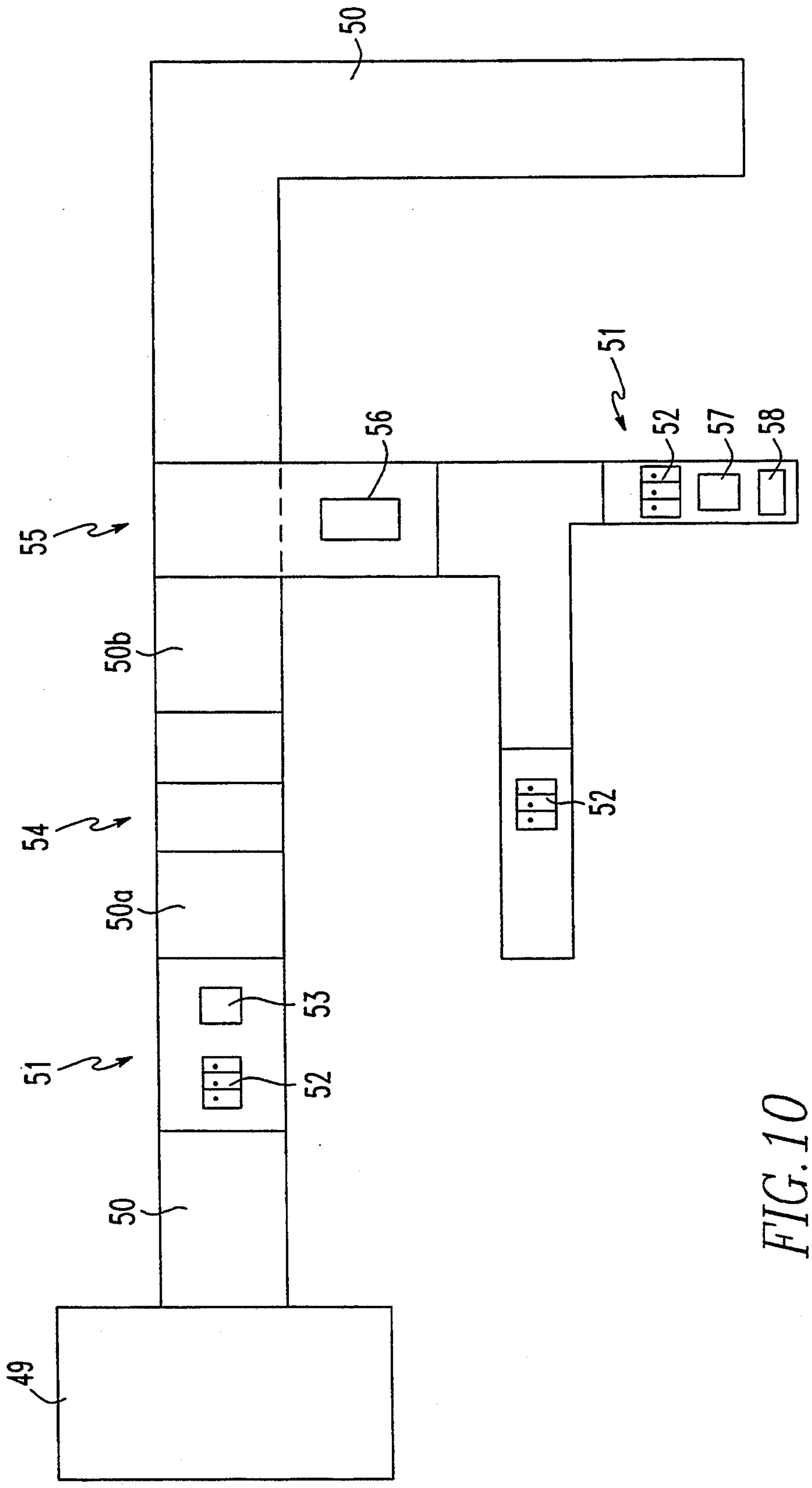
FIG. 10 is a schematic of an electrical installation.

FIG. 10 is a schematic illustration of a sample installation to illustrate the universal applicability of the energy distribution system. Individual conductors, either embedded or exposed, can preferably run in a raceway system 50 from the power station 49. As a result of the configuration according to the present invention, this conductor system can now be equipped with modular adapters, such as the previously described modular adapters 10, at essentially any desired point along the raceway system 50. A tap 51, for example, could have a modular adapter 10 on an underside thereof for connection to the conductors of the raceway system 50. This tap 51 could also be equipped with a fuse element 52 and a power outlet 53. The contacting between the tap 51 and the conductors can essentially be made in the manner described by any single one, or a combination of any of the embodiments described hereabove.

If this system is to be expanded, the cable raceway system can be extended by means of a rail connector, or rail contact 54. In this case, the rail contact 54 can be designed so that the modular adapter is equipped with twice the number of clamps in a line behind one another and connected by prefabricated cable. In other words, the rail contact 54 can have pairs of connected conductor clamps, preferably one pair for each conductor, which interconnected conductor clamps connect a conductor of a first raceway portion 50*a* to a conductor of a second raceway portion 50*b*.

Alternatively, if an additional circuit is required, for example, a tap with a sub-main distribution 55 can be installed. One possible configuration of the sub-main distribution 55 could preferably include a current meter 56 installed in this sub-main distribution 55. This current meter 56 can be required to measure the current consumed by the raceway system to which it is connected. It is also conceivable that modular adapters could be equipped only with .fuse elements 52.

Further, in laboratories and in medical treatment rooms in particular, it is generally important for the operating personnel to operate under conditions of maximum safety, and this is possible if, for example, the tap 51 is equipped with a fault interrupt switch 57 in addition to a fuse element 52. Once these safety requirements are met, an outlet connector 58 could be placed in the pre-wired module. As a result of this electrical energy distribution system, auxiliary devices can be installed without the use of cables, i.e. expansions can be added merely by plugging in and making connections at any desired point in the system.

As described previously, it is hereby further stated that each of the embodiments as discussed hereabove, are essentially interchangeable with one anon:her with regard to the type of conductor used, the manner in which the conductor is embedded in the insulating material, or the type of contact cross-bar used. In this regard, there are numerous other combinations of the above discussed features of the present invnetion which have not been discussed herein.

One feature of the invention resides broadly in the electrical energy distribution system with modular components, with electrical conductors running in the longitudinal direction, in which each electrical conductor has two legs parallel to one another and at the same potential, and each conductor can be contacted by a tap, characterized by the fact that to achieve contacting, each conductor 38, 39 and 6 running in the longitudinal direction and with its contact legs 67 and 68 or 85 and 86 can be contacted by means of a contact cross-bar 80 or 87 straddling these contact legs, and a rotating contact stud 40 generating a clamping force which can be inserted between the contact legs 67 and 68 or 85 and 86.

Another feature of the invention resides broadly in the electrical energy distribution system, characterized by the fact that the contact stud 40 has a curved contact stud head 71 which, when the shaft 36 rotates is pressed against projections 69 and 70 of the contact leg 67 and 68.

Still another feature of the invention resides broadly in the electrical energy distribution system with modular components, with electrical conductors running in the longitudinal direction, in which each electrical conductor has two legs parallel to one another and at the same potential, and each conductor can be contacted by a tap, characterized by the fact that for the contacting, each conductor 5, 27, 59 and 60 can be contacted with its contact legs 32 and 33; 64 and 65 or 73 and 74 by means of a contact cross-bar 80′ and 80″ straddling these contact legs, and a pressure piece which can be screwed in between the contact legs 32 and 33; 64 and 65 or 73 and 74 for contacting.

Yet another feature of the invention resides broadly in the electrical energy distribution system, characterized by the fact that there are flexible contact legs 91 and 92 or 89 and 90 on the contact cross-bar 80′ or 80″ between the clamping member 42 or 63 and the contact legs 64, 65, 73 and 74.

Still yet another feature of the invention resides broadly in the electrical energy distribution system, characterized by the fact that there are contact members 41, 43 and 44 between the contact legs 73 and 74 or 64 and 65 on the screw shaft of the thread 45, which can be pressed by the clamping member 42 against the contact legs 64, 65 and 73, 74.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

Nomenclature

1. Lower portion of housing
2. Upper portion of housing
3. Housing cover
4. Insulation material
5. Conductor
5′. Conductor
6. Conductor
7. Conductor
8. Neutral conductor
9. Equipment grounding conductor
10. Modular adapter
12. Fastener
13. Fastener
13′. Fastener
14. Fastener
15. Fastener
16. Contact stud
17. Contact stud
18. Contact stud
19. Contact stud
20. Contact stud 21. Rack-out device
22. Pressure contact surface
23. Shaft
24. Thread
25. Contact surface
26. Cable connection
27. Conductor
28. Anchor legs
29. Contact stud
30. Contact surface
30'. Contact surface
31. Contact surface
31'. Contact surface
32. Contact leg
33. Contact leg
34. Contact cross-bar leg
34'. Contact cross-bar leg
35. Contact cross-bar leg
35'. Contact cross-bar leg
36. Shaft
36'. Shaft
37. Mounting
38. Conductor
39. Conductor
40. Contact stud
41. Contact member
42. Clamping member
43. Contact member part
44. Contact member part
45. Thread
46. Space
47. Groove
48. Reduced cross section
49. Power station
50. Raceway
50*a*. 1st Raceway part
50*b*. 2nd Raceway part
51. Tap
52. Fuse element
53. Power socket
54. Rail joint contact
55. Tap with sub-main distribution
56. Current meter
57. FI switch
58. Outlet connector
59. Conductor
60. Conductor
61. Bevel
62. Bevel
63. Clamping member
64. Contact leg
65. Contact leg
67. Contact leg
68. Contact leg
69. Projection
70. Projection
71. Curved head of contact stud
72. Contact block
73. Contact leg
74. Contact leg
75. Contact surfaces
76. Contact surfaces
77. Contact surfaces
78. Contact surfaces
79. Base leg
80. Contact cross-bar
80'. Contact cross-bar
80''. Contact cross-bar
81. Pressure surface
82. Pressure surface
83. Bevel
84. Bevel
85. Contact leg
86. Contact leg
87. Contact cross-bar
88. Collar
89. Contact leg
90. Contact leg
91. Contact leg
92. Contact leg
93. Contact surface
94. Contact surface
95. Conical portion of stud 40
96. Nut
97. Base

What is claimed is:

1. A busbar system for distributing electrical energy, said busbar system comprising:

busbar conductor means for conducting electrical energy;

said busbar conductor means having a first surface thereon, and a second surface thereon opposite to said first surface;

tap means for providing a branch electrical pathway from said busbar conductor means, said tap means being engagable and disengagable with said busbar conductor means;

said tap means comprising:

a first projection extending therefrom;

said first projection having a first surface thereon, said first surface of said first projection being adjacent to and in contact with said first surface of said busbar conductor means;

means for pressing said first surface of said busbar conductor means into engagement with said first surface of said first projection of said tap means, said means for pressing being spaced apart from said first projection of said tap means, and said means for pressing being disposed adjacent said second surface of said busbar conductor means;

said means for pressing comprising a rotatable portion;

said rotatable portion comprising:

a first position adjacent said second surface of said conductor means, said rotatable portion in said first position comprising a first surface portion for being spaced apart from said second surface of said conductor means; and a second position adjacent said second surface of said conductor means, said rotatable portion in said second position comprising a second surface portion movably pressing said first surface of said conductor means into engagement with said first surface of said first projection of said tap means upon rotation of said rotatable portion;

means for rotating said rotatable portion between said first and second positions;

said busbar conductor means having a first end and a second end;

said second end of said busbar conductor means comprises a base portion extending substantially perpendicularly away from said first surface of said busbar conductor means;

said first end of said busbar conductor means comprises a projection extending substantially perpendicularly away from said second surface of said busbar conductor means;

said first projection of said tap means has a first end and a second end;

said first end of said first projection of said tap means being disposed adjacent said base portion of said second end of said busbar conductor means;

said rotatable portion comprises a third surface portion movably engaging and pressing against said projection of said first end of said busbar conductor means upon said rotating of said rotatable portion from said first position to said second position to pull said base portion of said second end of said busbar conductor means into tight engagement with said first end of said first projection of said tap means;

said busbar conductor means comprises first and second leg portions disposed substantially parallel to one another;

said first leg portion and said second leg portion each comprise a first surface of said busbar conductor means, a second surface of said busbar conductor means, a first end of said busbar conductor means and a second end of said busbar conductor means;

said second surfaces of said first and second leg portions are disposed towards one another;

said tap means comprises a second projection extending therefrom, said second projection being substantially parallel to and spaced apart from said first projection;

said first surface of said first projection of said tap means being disposed adjacent said first surface of one of said first and second leg portions of said busbar conductor means;

said second projection of said tap means comprises a first surface thereon, said first surface of said second projection of said tap means being disposed adjacent said first surface of the other of said first and second leg portion;

said means for pressing being disposed between said second surfaces of said first and second leg portions of said busbar conductor means;

said rotatable portion of said means for pressing movably pressing both of said first surfaces of said first and second leg portions into engagement with said first surfaces of said first and second projections of said tap means upon rotation of said rotatable portion from said first position to said second position;

said first end of said first and second leg portions of said busbar conductor means each comprise said projection extending substantially perpendicularly away from said second surface of said busbar conductor means;

said second end of each of said first and second leg portions is rigidly fixed with respect to said second end of the other of said first and second leg portions;

said second end of each of said first and second leg portions is rigidly disposed in an insulating material;

said tap means comprises a U-shaped portion, said U-shaped portion having a base means with said first and second projections extending therefrom;

said busbar conductor means comprises a U-shaped portion, said base portion at said second end of said first and second leg portions extends substantially perpendicularly between said first surfaces to connect said first and second leg portions;

said first and second leg portions are disposed within and substantially surrounded by said insulating material, said first surfaces of said first and second leg portions being spaced apart from said insulating material to form a space between said first and second leg portions and said insulating material;

said first and second projections of said tap means being disposed in said space between said first and second leg portions and said insulating material;

said means for pressing comprises shaft means extending from said means for rotating said rotatable portion through said base means of said U-shaped portion of said tap means to said rotatable portion;

said first and second leg portions of said busbar conductor means are disposed spaced apart a first distance from one another;

said rotatable portion comprises two first surface portions disposed substantially parallel to and opposite one another, said two first surface portions being parallel to and spaced apart from said second surfaces of said first and second leg portions in said first position of said rotatable portion;

said rotatable portion has a width between said first surface portions, said width being less than said first distance;

said rotatable portion comprises two second surface portions disposed opposite to one another, said two second surface portions movably pressing on said second surfaces of said first and second leg portions to press said first surfaces of said first and second leg portions into engagement with said first surfaces said first and second projections of said tap means;

each of said second surface portions of said rotatable portion being outwardly curved away from the other of said second surfaces;

said rotatable portion has a first end disposed adjacent said base portion of said busbar conductor means, and a second end disposed adjacent said projections of said first end of said first and second leg portions, said second end comprising said third surface portion, said third surface portion comprises a curvilinear surface disposed about said shaft means;

said third surface portion being curved convexly along said first surface portion and concavely along said said second surface portion;

said rotatable portion has a first height from said first end to said second end along first surface portion, and a second height from said first, end to said second end along said second surface portion, said second height being greater than said first height to engage said third surface with said projections of said leg portions and pull said first end of said first and second projections of said tap means into engagement with said base portion of said busbar conductor means upon rotation of said rotatable portion from said first position to said second position;

said insulating material comprises a thermosetting plastic molded about said base portion of said busbar conductor means;

said means for rotating said rotatable portion comprises a recessed configuration configured for receiving at least one of:

a screwdriver, and a hexagonal driver therein for rotating said means for rotating;

said system further comprises:

at least three of said busbar conductor means;

each of said at least three busbar conductor means being spaced apart a distance from one another and rigidly affixed within the insulating material;

said at least three busbar conductor means comprising:

a power conductor;

a neutral conductor; and an equipment grounding conductor;

at least three of said tap means, one each of said tap means corresponding to one each of said conductor means;

said at least three tap means being rigidly disposed within a plug-in module at a fixed spacing therebetween, said at least three tap means being molded into an insulating material to provide the fixed spacing between ones of said at least three tap means;

said fixed spacing between said at least three tap means substantially corresponding to said spacing distance of said at least three busbar conductor means;

a housing at least partially enclosing said at least three conductors, said housing having an open side thereof;

said plug-in module being disposable within said housing through said housing open side to substantially simultaneously contact said at least three tap means with said at least three busbar conductor means;

said plug-in module comprising spacing means for spacing said plug-in module a predetermined fixed distance from said at least three busbar conductor means;

said plug-in module comprising means for attaching a corresponding electrical device to said at least three tap means;

said corresponding electrical device comprising at least one of:

an electrical wire;

an electrical switch device;

a fault interrupt device;

outlet means for providing a further electrical connection;

a branch busbar conductor system;

said rotatable portion is rigidly connected to said shaft means of said means for pressing to rotate with said shaft means;

said tap means is H-shaped, said U-shaped portion of said tap means comprises a portion of said H-shaped tap means, and said tap means further comprises at least two additional projecting portions extending from said base portion thereof in a direction opposite to said first and second projections;

said means for rotating being disposed between said at least two additional projections; and said first end of said rotatable portion is conical about said shaft means for guiding said first end of said rotatable portion into position between said second surfaces of said first and second leg portions of said busbar conductor means upon insertion of said plug-in module into said housing.

2. A busbar system for distributing electrical energy, said busbar system comprising:

busbar conductor means for conducting electrical energy;

said busbar conductor means comprising first and second leg portions, said first and second leg portions being disposed parallel to one another and spaced apart from one another by a first distance;

each of said first and second leg portions having a first end portion and a second end portion disposed opposite to said first end portion, said first end portion of each of said first and second leg portions being disposed in fixed relationship to said first end portion of the other of said first and second leg portions;

each of said first and second leg portions having a first surface thereon, and a second surface thereon opposite to said first surface, said first and second surfaces extending substantially from said first end portion to said second end portion, and said first surface of each of said first and second leg portions being disposed towards said first surface of the other of said first and second leg portions;

tap means for providing a branch electrical pathway from said busbar conductor means, said tap means being engagable and disengagable with said busbar conductor means;

said tap means comprising:

a U-shaped portions, said U-shaped portion having a base part with first and second arm portions extending from said base part and spaced apart from one another by a second distance, said second distance being greater than said first distance for insertion of said U-shaped tap means over said first and second leg portions of said busbar conductor means;

said first and second arm portions each comprising a first end disposed away from said base part, said first arm portion having a first surface disposed adjacent to and in contact with said second surface of one of said first and second leg portions, and said second arm portion having a surface disposed adjacent to and in contact with said second surface of the other of said first and second leg portions; and wedge means disposed between said first and second arm portions, said wedge means being disposed between said first and second leg portions of said busbar conductor means upon insertion of said U-shaped portion of said tap means over said first and second leg portions to press said wedge means against said first surface of said first and second leg portions to press said second surface of said first and second leg portions into engagement with said first surface of said first and second arm portions of said tap mean; said wedge means comprises:

a first end inserted between said first and second leg portions from said second ends of said first and second leg portions in a direction towards said first fixed ends of said first and second leg portions;

a second end disposed opposite to said first end;

a first surface and a second surface, said second surface being disposed opposite to said first surface, and said first and second surfaces of said wedge means each extending from said first end of said wedge means at least a portion of the distance to said second end of said wedge means;

said wedge means having a first position between said first and second leg portions with said first end of said wedge means being spaced apart a third distance from said first end of said first and second leg portions, and at least one of said first and second surfaces of said wedge means disposed in loose engagement with said first surface of one of said first and second leg portions;

said wedge means having second position with said first end of said wedge means spaced apart a fourth distance from said first end of said first and second leg portions and each of said first and second surfaces of said wedge means pressing said first and second leg portions into engagement with said first and second arm portions of said tap means, said fourth distance being less than said third distance;

said tap means further comprises means for moving said wedge means from said first position to said second position to press said first and second leg portions into engagement with said first and second arm portions of said tap means;

said first end of said wedge means has a first width extending from said first surface of said wedge means to said second surface of said wedge portion, said first width being less than said first distance;

said second end of said wedge means has a second width extending from said first surface of said wedge portion to said second surface of said wedge portion, said second width being greater than said first distance;

said wedge means comprises a threaded orifice disposed in at least said second side thereof;

said base part of said U-shaped portion of said tap means has an orifice therethrough;

said means for moving comprises shaft means disposed through said orifice of said base part of said U-shaped portion of said tap means;

said base part of said tap means has a first side disposed between said first and second arm portions and a second side disposed opposite to the first side;

said shaft means has a first end and a second end, said second end of said shaft means comprises a threaded portion threaded into said threaded orifice of said wedge means, and said first end comprises knob means disposed adjacent said second side of said base portion;

said tap means comprising means for inhibiting rotation of said wedge means between said first and second arm portions;

said wedge means being movable between said first position and said second position upon rotation of said shaft means via said knob means to thread said shaft means into and out of said wedge means;

said busbar conductor means comprises a U-shaped portion having a base part, said base part having a first side and a second side, said first and second leg portions extending from said first side of said base part;

said second side of said base part comprising flanges extending away from said second side of said base part;

said extending flanges of said busbar conductor means being mounted in insulating material;

said shaft means disposed through said base part of said tap means comprises a disc shaped-member disposed about said shaft means adjacent said first side of said base part of said tap means;

said disc-shaped member being tightly engaged about said shaft means to retain said shaft means within said orifice of said base part of said tap means with said knob means adjacent said second side of said base part of said tap means;

said insulating material comprises a thermosetting plastic molded about said base part of said busbar conductor means;

said knob means for rotating said rotatable portion comprises a recessed configuration configured for receiving at least one of:

a screwdriver, and a hexagonal driver therein for rotating said shaft means via said knob means;

said system further comprises:

at least three of said busbar conductor means;

each of said at least three busbar conductor means being spaced apart a distance from one another and rigidly affixed within the insulating material;

said at least three busbar conductor means comprising:

a power conductor;

a neutral conductor; and an equipment grounding conductor;

at least three of said tap means, one each of said tap means corresponding to one each of said conductor means;

said at least three tap means being rigidly disposed within a plug-in module at a fixed spacing therebetween, said at least three tap means being molded into an insulating material to provide the fixed spacing between ones of said at least three tap means;

said fixed spacing between said at least three tap means substantially corresponding to said spacing distance of said at least three busbar conductor means;

a housing at least partially enclosing said at least three conductors, said housing having an open side thereof;

said plug-in module being disposable within said housing through said housing open side to substantially simultaneously contact said at least three tap means with said at least three busbar conductor means;

said plug-in module comprising spacing means for spacing said plug-in module a predetermined fixed distance from said at least three busbar conductor means;

said plug-in module comprising means for attaching a corresponding electrical device to said at least three tap means;

said corresponding electrical device comprising at least one of:

an electrical wire;

an electrical switch device;

a fault interrupt device;

outlet means for providing a further electrical connection;

a branch busbar conductor system; and said extending flanges being disposed at an obtuse angle with respect to said first and second leg portions.

3. A busbar system for distributing electrical energy, said busbar system comprising:

busbar conductor means for conducting electrical energy;

said busbar conductor means comprising a U-shaped busbar;

said U-shaped busbar comprising a base portion with first and second leg portions extending from said base portion, said first and second leg portions being disposed parallel to one another and spaced apart from one another by a first distance;

each of said first and second leg portions having a first end portion adjacent said base portion and a second end portion disposed opposite to said first end portion;

each of said first and second leg portions having a first surface thereon, and a second surface thereon opposite to said first surface, said first and second surfaces extending substantially from said first end portion to said second end portion, and said first surface of each of said first and second leg portions being disposed towards said first surface of the other of said first and second leg portions;

tap means for providing a branch electrical pathway from said busbar conductor means, said tap means being engagable and disengagable with said busbar conductor means;

said tap means comprising:

a U-shaped portion, said U-shaped portion having a base part with first and second portions extending from said base part;

said first and second arm portions being disposed spaced apart from one another, said first and second arm portions each comprising a first end disposed away from said base part, said first arm portion having a surface disposed adjacent to and in contact with said second surface of one of said first and second leg portions, and said second arm portion having a surface disposed adjacent to and in contact with said second surface of the other of said first and second leg portions;

an inner member disposed between said first and second arm portions, said inner member having a base portion disposed adjacent said base part of said U-shaped portion;

said inner member comprising first and second arm portions extending away from said base portion of said inner member, said first and second arm portions of said inner member being disposed in alignment with and spaced apart from said first and second arm portions of said U-shaped portion, and said first and second arm portions of said inner member each having a first end disposed away from said base part of said U-shaped portion;

said first arm portion of said inner member having a corresponding first surface disposed adjacent to and in contact with said first surface of one of said first and second leg portions, and said second arm portion of said inner member having a corresponding first surface disposed adjacent to and in contact with said first surface of the other of said first and second leg portions;

said first and second arm portions of said inner member each having a second surface disposed opposite to said corresponding first surface;

wedge means disposed between said first and second arm portions of said inner member adjacent said second surface of said first and second arm portions of said inner member;

said wedge means being movable between said first and second arm portions of said inner member press said first and second arm portions of said inner member into engagement with said first and second leg portions of said busbar conductor means and press said first and second leg portions of said busbar conductor means into engagement with said first and second arm portions of said U-shaped portion of said tap means;

said second surface of said first arm portion of said inner member is spaced apart from said second surface of said second arm portion of said inner member to form a wedge shaped space therebetween;

said wedge means comprises:

a first end and a second end, said second end being disposed opposite to said first end;

a first surface and a second surface, said second surface of said wedge means being disposed opposite to said first surface of said wedge means, and said first and second surfaces of said wedge means each extending from said first end of said wedge means to said second end of said wedge means;

said inner member and said wedge means having a first position of said wedge means between said first and second arm portions of said inner member with at least one of said first and second surfaces of said wedge means being in loose engagement with said second surface of one of said first and second arm portions of said inner member;

said inner member and said wedge means having a second position of said wedge means between said first and second arm portions of said inner member with each of said first and second surfaces of said wedge means pressing said first and second arm portions of said inner member towards said first and second arm portions of said U-shaped portion to clamp said first and second leg portions between said first and second arm portions of said inner member and said first and second arm portions of said U-shaped member;

said tap means further comprises means for moving said wedge means between said first position and said second position;

said wedge means comprises a threaded orifice disposed therein;

said base part of said U-shaped portion of said tap means and said base portion of said inner member each has an orifice therethrough, said orifice of said part of said U-shaped portion of said tap means being substantially aligned with said orifice of said base portion of said inner member;

said means for moving comprises shaft means disposed through said substantially aligned orifices;

said base portion of said inner member has a first side disposed between said first and second arm portions of said inner member and a second side disposed adjacent a first side of said base part of said U-shaped portion of said tap means, and said base part of said U-shaped portion of said tap means having a second side opposite the first side thereof;

said shaft means has a first end and a second end, said second end of said shaft means comprises a threaded portion threaded into said threaded orifice of said wedge means, and said first end comprises knob means disposed adjacent said second side of said base part of said U-shaped portion of said tap means;

said inner member comprising means for inhibiting rotation of said wedge Beans between said first and second arm portions of said inner member;

said wedge means being movable between said first position and said second position upon rotation of said shaft means via said knob means to thread said shaft means into and out of said wedge means;

said second surfaces of said first and second arm portions of said inner member have a first width therebetween adjacent said first ends of said first and second arm portions, and a second width towards said base portion of said inner member;

said first width being greater than said second width;

said first end of said wedge means being disposed towards said first end of said first and second arm portions of said inner member, said first end of said wedge means having a third width extending from said first surface of said wedge means to said second surface of said wedge means;

said second end of said wedge means has a fourth width extending from said first surface of said wedge means to said second surface of said wedge means, said third width being greater than said fourth width;

said wedge means is movable from said first position towards said base portion of said inner member to said second position;

said inner member comprises one of:

a one piece inner member forming each of said base portion of said inner mender and said first and second arm portions of said inner member;

two inner member pieces, each of said two inner member pieces forming at least a part of said base portion of said inner member and one of said first and second arm portions of said inner member;

an integrally molded part of said U-shaped portion of said tap means wherein said first ends of said first and second arm portions of said inner member are separated from said first ends of said first and second arm portions of said U-shaped portion of said tap means by slots, said slots receiving said first and second leg portions of said busbar conductor means therein, and said first and second arm portions of said inner member being connected to said base portion of said U-shaped portion by a connecting portion, said connecting portion having a flexibility sufficient for allowing movement of said first and second arm portions of said inner member towards and away from said first and second arm portions of said U-shaped member;

said base portion of said busbar conductor means is rigidly disposed in an insulating material;

said insulating material comprises a thermosetting plastic molded about said base portion of said busbar conductor means;

said knob means for rotating said rotatable portion comprises a recessed configuration configured for receiving at least one of:

a screwdriver, and a hexagonal driver therein for rotating said shaft means via said knob means;

said system further comprises:

at least three of said busbar conductor means;

each of said at least three busbar conductor means being spaced apart a distance from one another and rigidly affixed within the insulating material;

said at least three busbar conductor means comprising:

a power conductor;

a neutral conductor; and an equipment grounding conductor;

at least three of said tap means, one each of said tap means corresponding to one each of said conductor means;

said at least three tap means being rigidly disposed within a plug-in module at a fixed spacing therebetween, said at least three tap means being molded into an insulating material to provide the fixed spacing between ones of said at least three tap means;

said fixed spacing between said at least three tap means substantially corresponding to said spacing distance of said at least three busbar conductor means;

a housing at least partially enclosing said at least three conductors, said housing having an open side thereof;

said plug-in module being disposable within said housing through said housing open side to substantially simultaneously contact said at least three tap means with said at least three busbar conductor means;

said plug-in module comprising spacing means for spacing said plug-in module a predetermined fixed distance from said at least three busbar conductor means;

said plug-in module comprising means for attaching a corresponding electrical device to said at least three tap means;

said corresponding electrical device comprising at least one of:

an electrical wire;

an electrical switch device;

a fault interrupt device;

outlet means for providing a further electrical connection;

a branch busbar conductor system; and said extending flanges being disposed at an obtuse angle with respect to said first and second leg portions.

4. A busbar system for distributing electrical energy, said busbar system comprising:

busbar conductor means for conducting electrical energy;

said busbar conductor means comprising a U-shaped busbar;

said U-shaped busbar comprising a base portion with first and second leg portions extending from said base portion, said first and second leg portions being disposed parallel to one another and spaced apart from one another by a first distance;

each of said first and second leg portions having a first end portion adjacent said base portion and a second end portion disposed opposite to said first end portion;

each of said first and second leg portions having a first surface thereon, and a second surface thereon opposite to said first surface, said first and second surfaces extending substantially from said first end portion to said second end portion, and said first surface of each of said first and second leg portions being disposed towards said first surface of the other of said first and second leg portions;

tap means for providing a branch electrical pathway from said busbar conductor means, said tap means being engagable and disengagable with said busbar conductor means;

said tap means comprising:

a U-shaped portion, said U-shaped portion having a base part with first and second arm portions extending from said base part;

said first and second arm portions being disposed spaced apart from one another, said first and second arm portions each comprising a first end disposed away from said base part, said first arm portion having a surface disposed adjacent to and in contact with said second surface of one of said first and second leg portions, and said second arm portion having a surface disposed adjacent to and in contact with said-second surface of the other of said first and second leg portions;

an inner member disposed between said first and second arm portions, said inner member having a base portion disposed adjacent said base part of said U-shaped portion;

said inner member comprising first and second arm portions extending away from said base portion of said inner member, said first and second arm portions of said inner member being disposed in alignment with and spaced apart from said first and second arm portions of said U-shaped portion, and said first and second arm portions of said inner member each having a first end disposed away from said base part of said U-shaped portion;

said first arm portion of said inner member having a corresponding first surface disposed adjacent to and in contact with said first surface of one of said first and second leg portions, and said second arm portion of said inner member having a corresponding first surface disposed adjacent to and in contact with said first surface of the other of said first and second leg portions;

said first and second arm portions of said inner member each having a second surface disposed opposite to said corresponding first surface;

wedge means disposed between said first and second arm portions of said inner member adjacent said second surface of said first and second arm portions of said inner member;

said wedge means being movable between said first and second arm portions of said inner member to press said first and second arm portions of said inner member into engagement with said first and second leg portions of said busbar conductor means and press said first and second leg portions of said busbar conductor means into engagement with said first and second arm portions of said U-shaped portion of said tap means;

said second surface of said first arm portion of said inner member is spaced apart from said second surface of said second arm portion of said inner member to form a wedge shaped space therebetween;

said wedge means comprises:

a first end and a second end, said second end being disposed opposite to said first end;

a first surface and a second surface, said second surface of said wedge means being disposed opposite to said first surface of said wedge means, and said first and second surfaces of said wedge means each extending from said first end of said wedge means to said second end of said wedge means;

said inner member and said wedge means having a first position of said wedge means between said first and second arm portions of said inner member with at least one of said first and second surfaces of said wedge means being in loose engagement with said second surface of one of said first and second arm portions of said inner member;

said inner member and said wedge means having a second position of said wedge means between said first and second arm portions of said inner member with each of said first and second surfaces of said wedge means pressing said first and second arm portions of said inner member towards said first and second arm portions of said U-shaped portion to clamp said first and second leg portions between said first and second arm portions of said inner member and said first and second arm portions of said U-shaped member;

said tap means further comprises means for moving said wedge means between said first position and said second position;

said wedge means comprises a threaded orifice disposed therein;

said base part of said U-shaped portion of said tap means and said base portion of said inner member each has an orifice therethrough, said orifice of said base part of said U-shaped portion of said tap means being substantially aligned with said orifice of said base portion of said inner member;

said means for moving comprises shaft means disposed through said substantially aligned orifices;

said base portion of said inner member has a first side disposed between said first and second arm portions of said inner member and a second side disposed adjacent a first side of said base part of said U-shaped portion of said tap means, and said base part of said U-shaped portion of said tap means having a second side opposite the first side thereof;

said shaft means has a first end and a second end, said second end of said shaft means comprises a threaded portion threaded into said threaded orifice of said wedge means, and said first end comprises knob means disposed adjacent said second side of said base part of said U-shaped portion of said tap means;

said inner member comprising means for inhibiting rotation of said wedge means between said first and second arm portions of said inner member;

said wedge means being movable between said first position and said second position upon rotation of said shaft means via said knob means to thread said shaft means into and out of said wedge means;

said second surfaces of said first and second arm portions of said inner member have a first width therebetween adjacent said first ends of said first and second arm portions, and a second width towards said base portion of said inner member;

said second width being greater than said first width;

said first end of said wedge means being disposed towards said first ends of said first and second arm portions of said inner member, said first end of said wedge means having a third width extending from said first surface of said wedge means to said second surface of said wedge means;

said second end of said wedge means has a fourth width extending from said first surface of said wedge means to said second surface of said wedge means, said fourth width being greater than said third width;

said wedge means is movable from said first position away from said base portion of said inner member to said second position;

said inner member comprises an integrally molded part of said U-shaped portion of said tap means wherein said first ends of said first and second arm portions of said inner member are separated from said first ends of said first and second arm portions of said U-shaped portion of said tap means by slots, said slots receiving said first and second leg portions of said busbar conductor means therein, and said first and second arm portions of said inner member being connected to said base portion of said U-shaped portions by a connecting portion, said connecting portion having a flexibility sufficient for allowing movement of said first and second arm portions of said inner member towards and away from said first and second arm portions of said U-shaped member;

said base portion of said busbar conductor means is rigidly disposed in an insulating material;

said insulating material comprises a thermosetting plastic molded about said base portion of said busbar conductor means;

said knob means for rotating said rotatable portion comprises a recessed configuration configured for receiving at least one of:

a screwdriver, and a hexagonal driver therein for rotating said shaft means via said knob means;

said system further comprises:

at least three of said busbar conductor means;

each of said at least three busbar conductor means being spaced apart a distance from one another and rigidly affixed within the insulating material;

said at least three busbar conductor means comprising:

a power conductor;

a neutral conductor; and an equipment grounding conductor;

at least three of said tap means, one each of said tap means corresponding to one each of said conductor means;

said at least three tap means being rigidly disposed within a plug-in module at a fixed spacing therebetween, said at least three tap means being molded into an insulating material to provide the fixed spacing between ones of said at least three tap means;

said fixed spacing between said at least three tap means substantially corresponding to said spacing distance of said at least three busbar conductor means;

a housing at least partially enclosing said at least three conductors, said housing having an open side thereof;

said plug-in module being disposable within said housing through said housing open side to substantially simultaneously contact said at least three tap means with said at least three busbar conductor means;

said plug-in module comprising spacing means for spacing said plug-in module a predetermined fixed distance from said at least three busbar conductor means;

said plug-in module comprising means for attaching a corresponding electrical device to said at least three tap means;

said corresponding electrical device comprising at least one of:

an electrical wire;

an electrical switch device;

a fault interrupt device;

outlet means for providing a further electrical connection;

a branch busbar conductor system; and said extending flanges being disposed at an obtuse angle with respect to said first and second leg portions.

* * * * *

UNITED STATES PATENT AND TRADEMARK OFFICE

CERTIFICATE OF CORRECTION

PATENT NO. : 5,383,090

DATED : January 17, 1995

INVENTOR(S) : Hasso FREUNDNER and Walter GRABOWSKI

It is certified that error appears in the above-indentified patent and that said Letters Patent is hereby corrected as shown below:

In column 6, line 8, after 'first', delete "aeon" and insert --arm--.

In column 7, line 63, after 'studs', delete "116-20," and insert --16-20,--.

In column 10, line 58, after 'illustrated', delete "ill" insert --in--.

In column 10, line 65, after '44', delete "arid" and insert --and--.

In column 11, line 62, after the period, delete "Thins" and insert --This--.

In column 13, line 24, after 'with', delete ".fuse" and insert --fuse--.

In column 13, line 39, after 'one', delete "anon:her" and insert --another--.

In column 20, line 25, Claim 2, after the first occurrence of 'U-shaped', delete "portions," and insert --portion,--.

In column 23, line 64, Claim 3, before 'press' insert --to--.

In column 24, line 64, Claim 3, after 'wedge', delete "Beans" insert --means--.

UNITED STATES PATENT AND TRADEMARK OFFICE

CERTIFICATE OF CORRECTION

PATENT NO. : 5,383,090

DATED : January 17, 1995

INVENTOR(S) : Hasso FREUNDNER and Walter GRABOWSKI

It is certified that error appears in the above-indentified patent and that said Letters Patent is hereby corrected as shown below:

In column 25, line 25, Claim 3, after 'inner', delete "mender" insert --member--.

Signed and Sealed this

Twenty-fourth Day of December, 1996

Attest:

BRUCE LEHMAN

*Attesting Officer*

*Commissioner of Patents and Trademarks*